March 19, 1963 M. COE 3,081,591
FRUIT PICKER
Filed Dec. 26, 1961
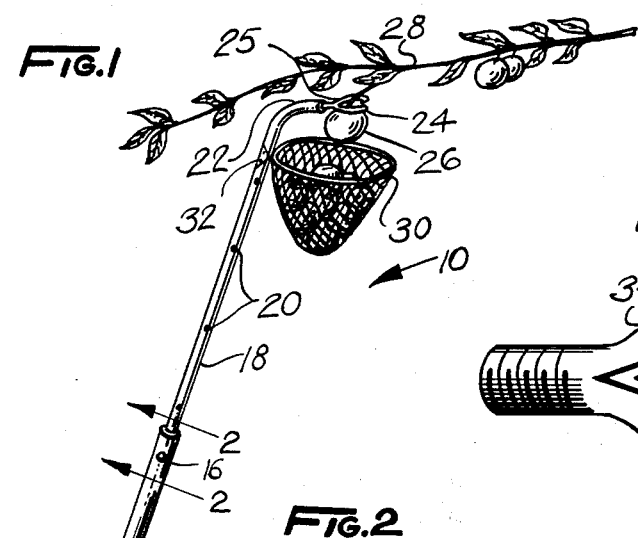
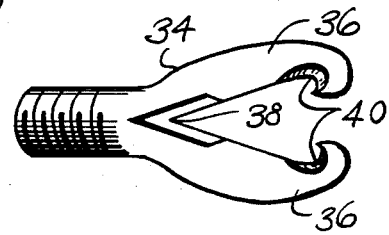
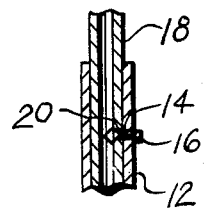
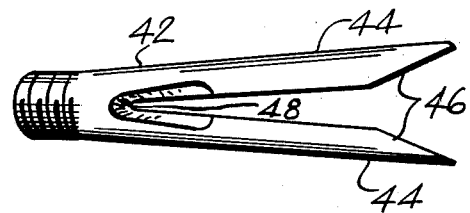
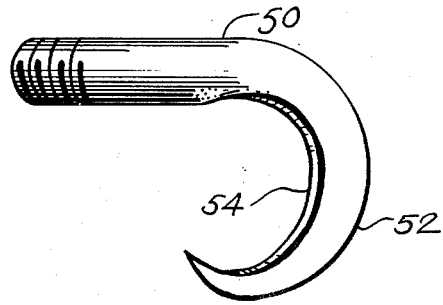
INVENTOR.
MARY COE
Mary Coe

United States Patent Office 3,081,591
Patented Mar. 19, 1963

3,081,591
FRUIT PICKER
Mary Coe, 1250 S. Hanson St., Philadelphia 43, Pa.
Filed Dec. 26, 1961, Ser. No. 161,824
1 Claim. (Cl. 56—339)

This invention relates to improvements in fruit picking implements.

It is an object of the present invention to provide a fruit picker that will enable the operator to obtain the best fruits which are usually near the top of the tree or far out on the end of the limb.

Another object of the present invention is to provide a fruit picker that is adjustable and will pull the fruit off the branch or cut it from the branch.

Another object of the present invention is to provide a fruit picker that is versatile and may be used for picking various types of fruits.

Other objects of the invention are to provide a fruit picker bearing the above objects in mind which is of simple construction, has a minimum number of parts is inexpensive to manufacture and efficient in operation and use.

For other objects and for a better understanding of the invention, reference may be had to the following detailed description taken in conjunction with the accompanying drawing, in which:

FIGURE 1 is a perspective view comprising the main embodiment of the present invention;

FIG. 2 is a view taken on the lines 2—2 of FIG. 1;

FIG. 3 is a perspective view showing a modified attachment;

FIG. 4 is a perspective view showing another modified attachment; and

FIG. 5 is a perspective view showing still another modified form of attachment.

Referring now more in detail to the drawing, a fruit picker 10 made in accordance with the present invention is shown to include a handle 12 of elongated and hollow configuration with a circular opening 14 therethrough one side near its upper end which receives a spring loaded snap-in lock pin 16. A tubular rod 18 having a plurality of equally spaced apart openings therethrough 20 is slidably received therewithin handle 12 providing an adjustment of the length of fruit picker 10 and is secured at any suitable length by lock pin 16 which is received within the opening 14 of handle 12 and the opening 20 of rod 18. The upper end 22 of rod 18 is bent in an arcuate curve and threadingly receives a V-shaped cutting and picking arm or member 24 having a cutting edge at the apex 25 which may be used to cut the fruit 26 from the limb 28 which will then drop into the basket 30 which is fixedly secured below the arm 24 to the rod 18 by a fixedly secured bracket 32. A modified arm or member 34 having spread apart fingers 36 and at the apex 38 having a sharp cutting edge and the outer ends of fingers 36 are hooks having sharp cutting edges 40 inside of the arc.

A modified arm or member 42 is shown to include a pair of spaced apart fingers 44 forming a sharp V configuration, and the fingers 44 are wedge-shaped points 46, and the inner apex 48 forms a sharp cutting edge.

Still another modified form of arm 50 is shown to include a semicircular hook 52 having a cutting edge 54 along its inner periphery.

In operation, the picker 10 is adjusted to a suitable height by sliding the rod 18 in and out of the handle 12 until an opening 20 aligns with an opening 14 of the handle and the lock pin 16 is snapped in place thus securing the handle 12 to the rod 18. The rod is held in the hand and manipulated until the arm 24 encloses the stem of the fruit 26 and by a pulling motion downwardly removes the fruit 26 which will then drop into the basket 30. In the event the fruit cannot be retrieved by the pulling down motion, the sharp edged apex 25 can be forced against the stem of the fruit 26, thus cutting the fruit 26 loose.

The modified arms 34, 42 and 50 are used in a manner that is obvious.

It will thus be recognized that the fruit picker 10 enables the operator to have access to all sections of the tree.

While various changes may be made in the detail construction it shall be understood that such changes shall be within the spirit and scope of the present invention as defined by the appended claims.

What I claim as new and desire to protect by Letters Patent of the United States is:

A fruit picker comprising, in combination, a substantially hollow and elongated handle, an elongated rod having one end slidably received within said handle, the other end of said rod having an arcuate configuration, a member threadingly received on said arcuate end, a snap-in lock pin mechanism for securing said handle in selective position relative to said rod, said lock pin mechanism comprising a plurality of equally spaced apart circular openings in said rod, a singular opening in said handle, said openings of said rod and said opening of said handle being in alignment and a spring loaded snap-in lock pin engaged through said opening in said handle and selectively through one of said openings in said rod, said member including a pair of diverging fingers defining a substantially V-shaped opening, the outer ends of said fingers extending inwardly toward each other to form spaced hooks, each hook having an arcuate cutting edge on its inward side, said member also having cutting edge at the apex of said fingers, and a basket affixed to said rod below said member for receiving therein said fruit from said tree.

References Cited in the file of this patent
UNITED STATES PATENTS

| | | |
|---|---|---|
| 338,010 | Ziegler | Mar. 16, 1886 |
| 462,386 | Reno et al. | Nov. 3, 1891 |
| 972,900 | Mosier | Oct. 18, 1910 |
| 1,089,521 | Allsteadt | Mar. 10, 1914 |
| 1,388,106 | Emerson | Aug. 16, 1921 |